United States Patent
Kamotsky

(10) Patent No.: US 9,633,085 B2
(45) Date of Patent: Apr. 25, 2017

(54) METHOD FOR CALCULATING RELEVANCY SCORES OF SEARCH RESULTS

(71) Applicant: Macy's West Stores, Inc., Cincinnati, OH (US)

(72) Inventor: Denis Kamotsky, San Francisco, CA (US)

(73) Assignee: Macy's West Stores, Inc., Cincinnati, OH (US)

( * ) Notice: Subject to any disclaimer, the term of this patent is extended or adjusted under 35 U.S.C. 154(b) by 241 days.

(21) Appl. No.: 14/298,043

(22) Filed: Jun. 6, 2014

(65) Prior Publication Data

US 2015/0356086 A1    Dec. 10, 2015

(51) Int. Cl.
*G06F 7/02* (2006.01)
*G06F 17/30* (2006.01)

(52) U.S. Cl.
CPC .... *G06F 17/3053* (2013.01); *G06F 17/30477* (2013.01); *G06F 17/30687* (2013.01); *G06F 17/30864* (2013.01); *G06F 17/30873* (2013.01)

(58) Field of Classification Search
None
See application file for complete search history.

(56) References Cited

U.S. PATENT DOCUMENTS

| | | | | |
|---|---|---|---|---|
| 6,012,053 A * | 1/2000 | Pant | ............ | G06F 17/30696 |
| 7,958,116 B2 * | 6/2011 | House | ............ | G06F 17/30675 707/723 |
| 8,407,229 B2 * | 3/2013 | Yang | ............ | G06F 17/30864 707/748 |
| 2014/0297476 A1 * | 10/2014 | Wang | ............ | G06Q 30/0625 705/26.62 |
| 2015/0310115 A1 * | 10/2015 | Ryger | ............ | G06F 17/30011 707/708 |

* cited by examiner

*Primary Examiner* — Bruce Moser
(74) *Attorney, Agent, or Firm* — Amster, Rothstein & Ebenstein LLP

(57) ABSTRACT

A method including the steps of: receiving, using one or more processors, a search query containing search terms from a user device; executing, using one or more processors, a query on a database based in response to the received search query; generating, using or more processors, search results based on the executed query; calculating, using one or more processors, a relevancy score for each of the generated search results, wherein the relevancy score is determined based on match properties of the search terms and field terms of a matching field; assigning, using one or more processors, a calculated relevancy score to each of the generated search results; and transmitting, using or more processors, the scored search results for display as a ranked list on the user device.

27 Claims, 4 Drawing Sheets

METHOD FOR CALCULATING RELEVANCY SCORES OF SEARCH RESULTS

FIELD OF THE INVENTION

The present invention generally relates to methods for ranking or scoring the relevancy of search results returned from a search on a database, and more particularly, the present invention relates to methods for a search engine adaptable for an electronic commerce website to determine and assign to each matching product in the search results a numeric value that indicates the degree of similarity between the query string and the indexed field information associated with a matching product.

SUMMARY OF THE INVENTION

Methods for calculating the relevancy scores of search results returned by a keyword search are provided.

A method according to an exemplary embodiment of the present invention comprises the steps: receiving, using one or more processors, a search query containing search terms from a user device; executing, using one or more processors, a query on a database based in response to the received search query; generating, using or more processors, search results based on the executed query; calculating, using one or more processors, a relevancy score for each of the generated search results, wherein the relevancy score is determined based on match properties of the search terms and field terms of a matching field; assigning, using one or more processors, a calculated relevancy score to each of the generated search results; and transmitting, using or more processors, the scored search results for display as a ranked list on the user device.

In an exemplary embodiment, match properties comprise the number of search terms, the number of search terms matched in a field, and the number of terms in a field.

In an exemplary embodiment, the step of calculating a relevancy score comprises determining the type of search query executed and selecting a formula based on the type of search query executed.

In an exemplary embodiment, the step of calculating a relevancy score for a pattern search comprises calculating the relevancy score in accordance to the following formula:

$$R_{pat} = \sum_{m=1}^{M} \Phi\left(\frac{Q_m}{Q}\right) * B_m * P_m$$

where $R_{pat}$ is the relevancy score of a search result, M is the total number of matches between shingles of a query partition and field terms of a search result, $Q_m$ is the number of query words matched in field m, $B_m$ is the boost factor for a match in field m, $P_m$ is a linguistic penalty of a match in field m, Q is the total query length, and $\Phi( )$ is a function of match length that represents a desired relevancy calculation model.

In an exemplary embodiment, the function $\Phi( )$ is a superlinear function.

In an exemplary embodiment, the function $\Phi(x,a)$ is a function of match length, $Q_m$, and of a ratio of match length to the length of the longest matchable portion of field m, $$\frac{Q_m}{|L_m|}.$$

In an exemplary embodiment, the function $\Phi(x,a)$ satisfies the following condition: $\Phi(x,a) < \Phi(x,b)$ where $a<b$.

In an exemplary embodiment, the function $\Phi(x,a)$ satisfies the following condition $\Phi(x,1) < \Phi(y, 1)$ where $x<y$.

In an exemplary embodiment, the function $\Phi(x,a)$ satisfies the following condition $\Phi(x,a)+\Phi(y,a)<\Phi(x+y,a)$ where $a<1$.

In an exemplary embodiment, the function $\Phi(x,a)$ satisfies the following condition $\Phi(x,1)+\Phi(y,1)=\Phi(x+y,1)$.

In an exemplary embodiment, the function $\Phi(x,a)$ is $x^{2-a}$.

In an exemplary embodiment, the step of calculating a relevancy score for a pattern search comprises calculating the relevancy score in accordance to the following formula $$R_{pat} = \sum_{m=1}^{M} \left(\frac{Q_m * P_m}{Q}\right)^{\left(2-\frac{Q_M}{|L_m|}\right)} * B_m$$

where $R_{pat}$ is the relevancy score of a search result, M is the total number of matches between shingles of a query partition and field terms of a search result, $Q_m$ is the number of query words matched in field m, $|L_m|$ is the length of the longest matchable part of field m, $B_m$ is the boost factor for a match in field m, $P_m$ is a linguistic penalty of a match in field m, and Q is the total query length.

In an exemplary embodiment, the function $\Phi(x,a)$ is $x^{2-a}$.

In an exemplary embodiment, the match properties for a conventional tokenized text search comprise slop distance.

In an exemplary embodiment, the step of calculating a relevancy score for a conventional tokenized text search comprises calculating the relevancy score in accordance to the following formula:

$$R_{txt} = \sum_{f=1}^{F} \Phi\left(\frac{\sum_{n=1}^{N_f} P_{f,n}}{Q}\right) * B_f$$

where $R_{txt}$ is the relevancy score of a search result, F is the total number of matched fields, $N_f$ is the total number of matches in a field f, $P_{f,n}$ is a linguistic penalty of a the n-th match in field f, $B_f$ is the boost factor for a match in field f, Q is the total query length, and $\Phi( )$ is a function of match length that represents a desired relevancy calculation model.

In an exemplary embodiment, the match properties for a conventional tokenized text search comprise slop distance.

In an exemplary embodiment, the step of calculating a relevancy score for a conventional text search comprises calculating the relevancy score in accordance to the following formula:

$$R_{txt} = \sum_{f=1}^{F} \left(\frac{\sum_{n=1}^{N_f} P_{f,n}}{Q}\right)^{\left(2-\frac{N_f}{L_f}\right)} * B_f$$

where $R_{txt}$ is the relevancy score of a search result, F is the total number of matched fields, $N_f$ is the total number of matches in a field f, $L_f$ is the total number of field terms in field f, $P_{f,n}$ is a linguistic penalty of a the n-th match in field f, $B_f$ is the boost factor for a match in field f, and Q is the total query length.

In an exemplary embodiment, the step of calculating a relevancy score for a conventional text search comprises calculating the relevancy score in accordance to the following formula:

$$R_{txt} = \sum_{f=1}^{F} \left( \frac{\sum_{n=1}^{N_f} P_{f,n}}{Q} \right)^{\left(2-\frac{N_f}{L_f}\right)} * |\psi_f| * B_f$$

where $R_{txt}$ is the relevancy score of a search result, F is the total number of matched fields, $N_f$ is the total number of matches in a field f, $L_f$ is the total number of field terms in field f, $P_{f,n}$ is a linguistic penalty of a the n-th match in field f, $B_f$ is the boost factor for a match in field f, Q is the total query length, and $\Psi f(\ )$ is a proximity scoring function.

In an exemplary embodiment, the function $\Psi f(\ )$ is a ratio of the number of matched query terms in a field and the sum of the number of matched query terms and slop distance between matched field terms in a field.

BRIEF DESCRIPTION OF THE DRAWINGS

The features and advantages of the present invention will be more fully understood by reference to the following detailed description of illustrative embodiments of the present invention when taken in conjunction with the following figures, wherein.

DETAILED DESCRIPTION

Figure 1:
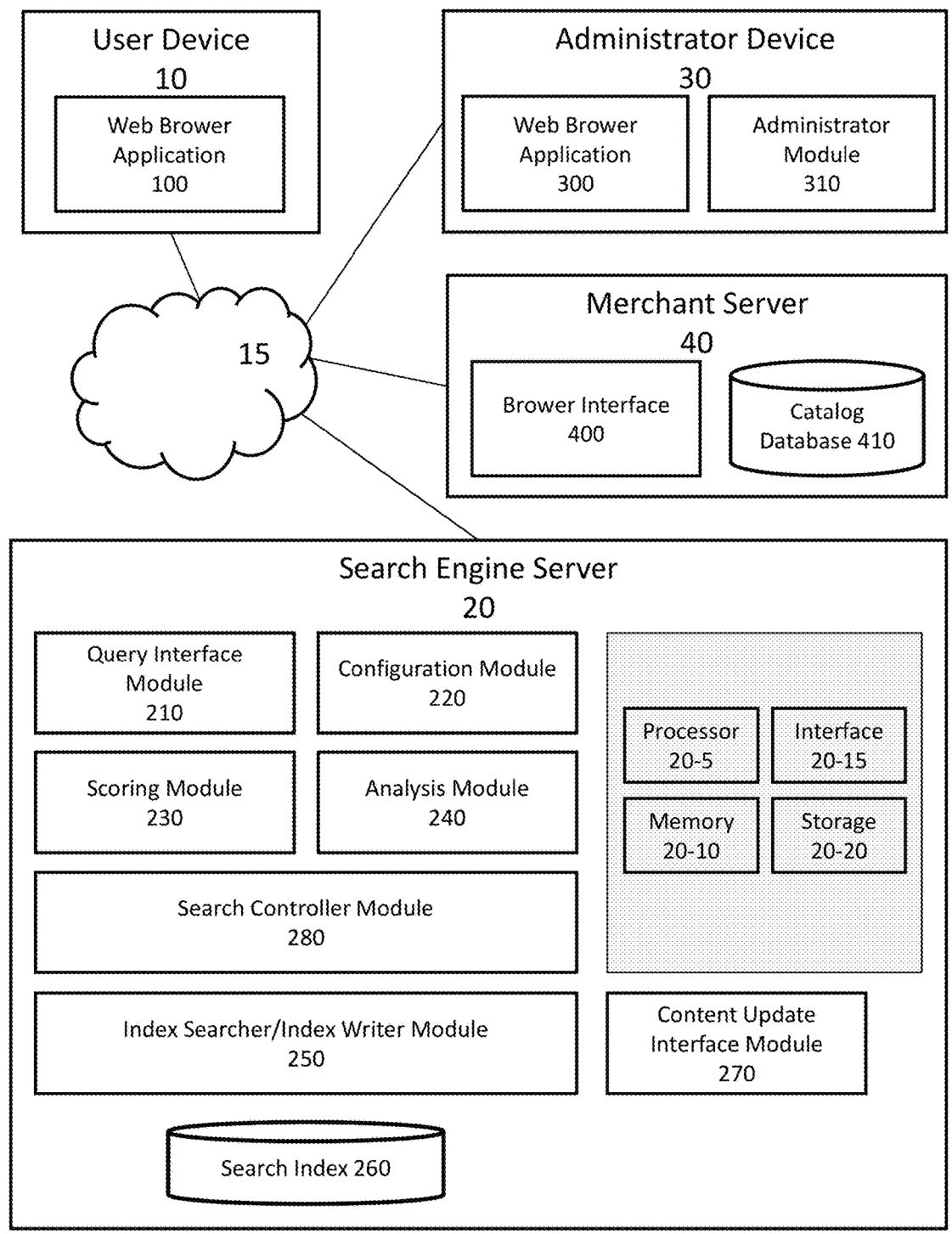
FIG. 1 is a schematic diagram of a search engine server system in accordance with exemplary embodiments of the present invention.

In presenting search results, such as search results for a keyword-based product search query on an electronic commerce website, it is important to prioritize the presentation of search results that are more relevant to the query. Otherwise, an online shopper may have to browse through ostensibly matching products that are less relevant to locate a desired product.

A search engine for a keyword-based search query is configured to strike a balance between precision and recall. Without further processing, the search results are returned in no particular order and may be of varying degrees of relevancy. Thus, relevant results may be obscured by irrelevant or unwanted results. To mitigate this concern, search engines presently use various techniques to attempt to present more relevant results before less relevant results, including, for example, assigning a relevancy score or rank to the search results and returning search results sorted according to their relevancy score or rank. In a typical search engine used for searching text documents in a database, the search engine may calculate and assign a relevancy score or rank to each search result based in part on the frequency of occurrence of a query term in the matching document and the frequency of occurrence of the query term in all the of documents in the database.

The relevancy scoring or ranking model used for general text document searches may not be optimal for searches such as product searches. Product descriptions are generally brief, may not contain many repeated terms with respect to a particular product, and may share common terms such as color etc. among a plurality of products. Thus, the use of a relevancy scoring or ranking model which relies on the frequency of occurrence of a query term would be overly complicated and may not be appropriate in connection with an electronic commerce application where product information is concise and search queries contain terms that are common among a broad range of products. In a search engine platform adapted for product searches in an electronic commerce application, the product description information that an online shopper is likely to be most interested in, including, for example, an attribute of the product, e.g., brand, size, color, type, title, etc., is indexed in various corresponding field indices that facilitate searches of the product database. Because the pertinent information describing a product is already present in the indexed fields, it may be sufficient to determine the quality of a match based on how well the search query terms match the indexed terms in the matched fields, i.e., what fields are matched, number of fields that matched, number of query and/or field terms that matched, number of consecutive query and/or field terms that matched, etc.

Accordingly, various exemplary embodiments of the present invention are directed to methods for implementing relevancy calculations in a search engine platform adapted for electronic commerce applications, or other types of searchable electronic documents applications having similar content profiles, that can calculate a relevancy score or rank of a match based on corresponding matched query and field terms. The relevancy scoring or ranking module in the exemplary embodiments calculate and assign a relevancy score or rank based on the degree of similarity between the terms of a query string and the terms of an indexed field value corresponding to particular product information associated with a matching product. In exemplary embodiments, the relevancy score of a search result may be calculated based on, for example, the number of matched terms, the match length, the query length, the relative importance of the matched field, and any linguistic factors.

The various exemplary embodiments of the present invention described herein may be implemented using one or more computer systems including one or more processors, one or more memory devices, one or more communication interfaces, and one or more persistent storage devices, including, one or more computer readable media including computer-readable code containing instructions for the one or more processors to perform processing steps. The one or more computer systems may form part of a network, such as a local area network or a wide area network, such as, for example, the Internet. In exemplary embodiments, the one or more computer systems may include standard hardware components and/or specialized hardware components.

The methods of the present invention may be operated as part of a system for electronic commerce comprising one or more user devices that interact through a network with one or more merchant servers that offer goods for sale via a web page or electronic application. Referring to FIG. 1, search queries generated by online shoppers from one or more user devices 10, such as tablets, smartphones, or computers, connected through a network, such as the Internet 15, may be transmitted to one or more merchant servers 40 which, in turn may transmit the search query through the network to one or more search engine servers 20. One or more administrator devices 30, connected through the network to one or more merchant servers or one or more search engine servers, may be used for configuring such servers. In other embodiments, one or more of the functions of each of these devices and servers may be combined into a single server, and/or divided up among one or more other servers performing duplicate and/or portions of the functions.

Referring to FIG. 1, a search engine server 20 may contain a query interface module 210 to receive search queries and to sort and transmit search results, a content update interface module 270 to receive indexing requests, an analysis module 240 to process query strings for searching and field values for indexing, a scoring module 230 to calculate relevancy ranks of search results, and an index searcher/writer module 250 that interfaces with the search index 260 database to create or edit indexed terms or to search the index for matching terms.

In at least one exemplary embodiment, the index searcher/writer module 250 and the search index database 260 may be modules from a basic document search engine that are capable of a full conventional keyword search using a searchable keyword index. Typically, the search index database 260 may comprise one or more documents and each document having one or more fields that may be separately indexed for searching. In connection with an electronic commerce application, a "document" may correspond to a particular product sold by a merchant and each searchable field of a "document" may correspond to a certain attribute of the product, such as, but not limited to, brand, size, color, type, title, etc.

In at least one exemplary embodiment, the search index database 260 contains multiple searchable indices that facilitate the searching of products. Each index is associated with a particular attribute of a product and is generated from one or more terms corresponding to the particular attribute of all the products.

Figure 2:
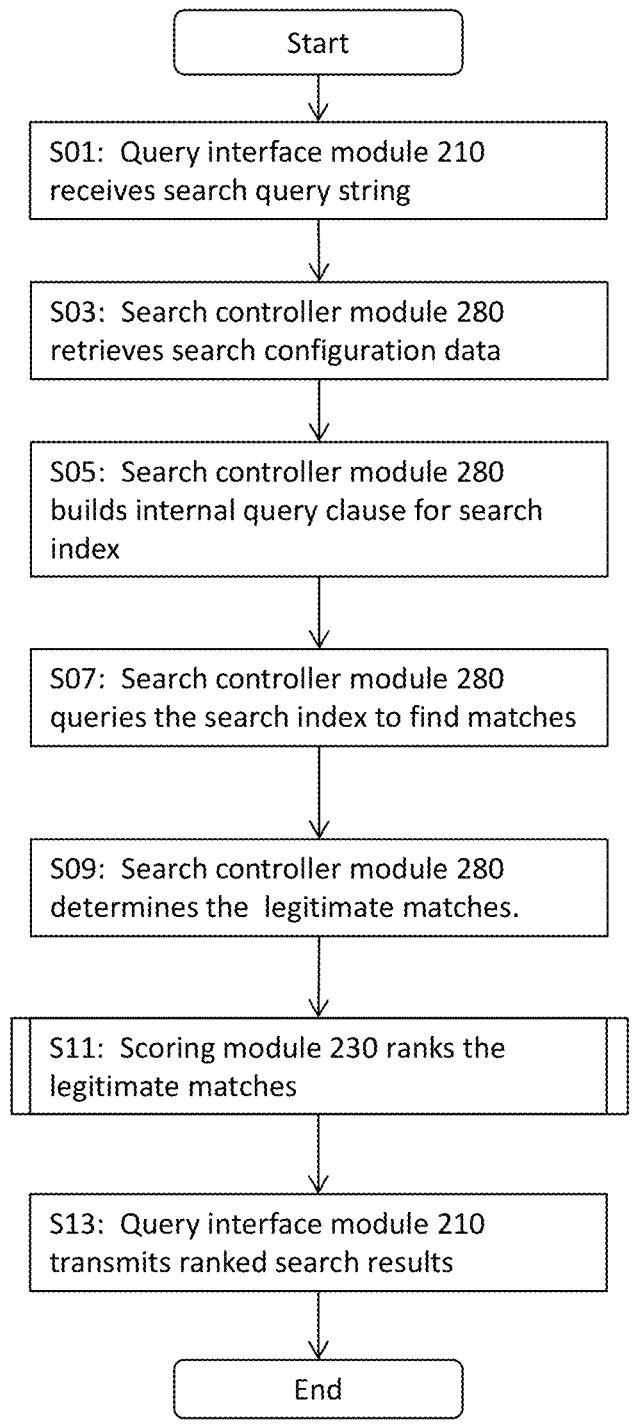
FIG. 2 is a high level flow chart of a process for performing searches in accordance with exemplary embodiments of the present invention

FIG. 2 shows a high level flow chart illustrating an exemplary keyword-based search algorithm. In step S01, a query interface module 210 of search engine server 20 receives a search query string. In step S03, the search controller module 280 retrieves search configuration information (e.g., including search parameters and search constraints for various search strategies) from the configuration module 220. In step S05, the search controller module 280 builds an internal query clause for the index searcher/index writer module 250 based on the received search query string and the retrieved search configuration information. In step S07, the search controller module 280 executes the generated internal query clause to find all matches in the product data that is stored in search index database 260. In step S09, the search controller module 280 identifies the legitimate matches. In step S11, the scoring module 230 ranks the legitimate matches. The scoring formula used to rank the matches depends on the type of keyword-based search that is performed. In step S13, the query interface module 210 transmits the ranked legitimate matches as search results.

Figure 3:
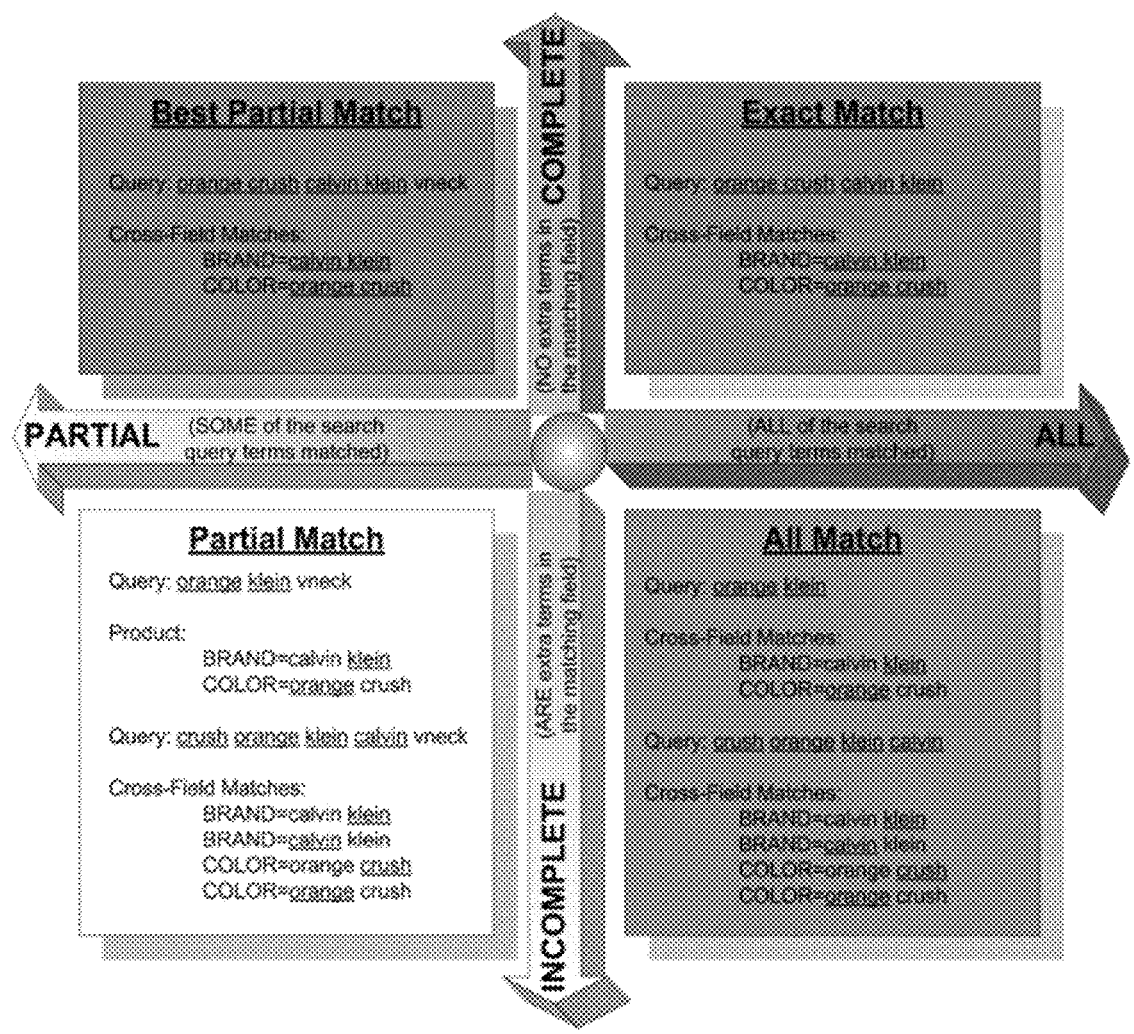
FIG. 3 is a chart showing different types of match strategies that can be implemented in a search pass, organized along two axes.

In a co-pending application, U.S. patent application Ser. No. 14/292,018, entitled System and Method For Performing A Pattern Matching Search, filed May 30, 2014, the contents of which are incorporated herein by reference in their entirety, various keyword-based searches are described, including a typical tokenized keyword search (i.e., a conventional keyword search) and a more context oriented keyword search (i.e., a Pattern search). As described in the co-pending application, a Pattern search, is a keyword based search that works by partitioning the search query to form sets of phrases, i.e. shingles, and then attempting to find a match for each phrase in a query partition set in one or more of the designated fields. A pattern match, may require one or more phrases in a query partition set to be matched. A match of a phrase may require consuming some or all of the terms of a field value of a designated field, depending on configuration requirements. Referring to FIG. 3, there are several types of match strategies that can be implemented in a search pass, as organized along two axes in the illustration. The axes relate to the circumstance where unmatched terms are allowed either in the query and/or in the document fields. Each quadrant defines a match strategy: exact match, all match, best partial match, and partial match. For an exact pattern match, all query terms are matched and all field terms in the matching field are matched. For an all pattern match, all query terms are matched but some of the field terms in the matching field are left unmatched. For a best partial pattern match, only some of the query terms are matched but all of the field terms in the matching fields are matched. For a partial pattern match, only some of the query terms and only some of the field terms in the matching field are matched. In general, when ranking pattern matches, exact pattern matches are more relevant than all pattern matches which are more relevant than best partial pattern matches which are more relevant than partial matches.

In at least one embodiment of the present method of relevancy calculation, the relevancy score or rank of a search result of a Pattern search is generally defined as $$R_{pat} = \sum_{m=1}^{M} \Phi\left(\frac{Q_m}{Q}\right) * B_m * P_m \qquad \text{(Eq. 1)}$$

where $R_{pat}$ is the document rank, M is the total number of matches of phrases of a query partition and field terms of a search result, $Q_m$ is the number of query words matched in field m, $B_m$ is the boost factor for a match in field m, $P_m$ is a linguistic penalty of a match in field m, Q is the total query length, and $\Phi()$ is a function of match length that represents a desired relevancy calculation model. $B_m$ and $P_m$ are scoring adjustment factors. These factors will be discussed in greater detail below.

The function, $\Phi()$, may be selected to be compatible with one or more match strategies. In at least one exemplary embodiment, the function, $\Phi()$, should contribute to provide a higher relevance score to pattern matches that consume all search query terms. For example, the calculated relevancy score should take into consideration the number of search query terms that were not matched. If only the number of matched search query terms is considered in the calculated relevancy score, a match where more words are omitted would be ranked the same as a match where fewer words are omitted. It is desirable to have a function that makes a distinction between these match circumstances. To avoid assigning the same rank to the results of these match circumstances, the calculated relevancy score may be normalized by the total search query length, i.e., the number of search query terms, Q.

In at least one exemplary embodiment, the function, $\Phi()$, should contribute to provide a higher relevance score to longer matches and a lower relevance score to multiple shorter matches in pattern matches where the same number of search query terms are matched. The calculated relevancy score should take into consideration the number of consecutive search query terms that matched. If only the number of search query terms that matched is considered in the calculated relevancy score, a match where two non-adjacent words in the same field matched would be ranked the same as a single match on two adjacent words, i.e., a two-word shingle, in the same field. A w-shingle is a contiguous subsequence of w terms. For example, a 2-shingling of a field value having the terms {a, b, c, d, e, f} would comprise the set of all contiguous subsequences comprising two terms, i.e., {(a, b), (b, c), (c, d), (d, e), (e, f)}. It is desirable to have a function such that longer shingle matches are ranked higher than a combination of shorter shingle matches in the same field. To satisfy this ranking requirement, the function, $\Phi()$, would need to be a superlinear function, i.e., a function such that $\Phi(x)+\Phi(y)<\Phi(x+y)$.

In at least one exemplary embodiment, the function, $\Phi()$, should provide a higher relevance score to field matches in fields that consume all field terms than to those that do not.

Complete matches and incomplete matches need to be distinguished when calculating a relevancy score. Otherwise, incomplete matches would be ranked the same as complete matches when the number of matching field terms are the same. To avoid assigning the same rank under this circumstance, the function, $\Phi()$, should be a function of the ratio of the number of matched search query terms to the total number of field terms in the matched field. This can be expressed as $$\frac{Q_m}{L_m}$$

where $L_m$ is the total length of the field m in words, i.e., the total number of terms in the field value for field m. For shingled fields, it is impossible to match a portion of the field longer than the max shingle length for that field, therefore $$\frac{Q_m}{|L_m|}$$

should be used where $|L_m|$ is the length of the longest matchable part of the field m.

These three objectives would be satisfied in a calculated relevancy score based on Eq. 1, if a function, $\Phi()$, satisfying the following conditions:

$\forall\, x \in (0, 1], y \in (0, 1], a \in (0, 1], b \in (0, 1]$ $\Phi(x, a) > 0$ $a < b \Rightarrow \Phi(x, a) < \Phi(x, b)$: favors larger percentage matched $x < y \Rightarrow \Phi(x, 1) < \Phi(y, 1)$: favors longer matches $a < 1 \Rightarrow \Phi(x, a) + \Phi(y, a) <$ $\Phi(x + y, a)$: favors longer matches to multiple matches $\Phi(x, 1) + \Phi(y, 1) = \Phi(x + y, 1)$: neutral on complete matches where $0 < x = \frac{Q_m}{Q} \leq 1$;

$0 < y = \frac{Q_m}{Q} \leq 1$;

$0 < a = \frac{Q_m}{|L_m|} \leq 1$;

$0 < b = \frac{Q_m}{|L_m|} \leq 1$;

were to be chosen.

In at least one exemplary embodiment, the function $\Phi(x,a)=x^{2-a}$ is used because it would satisfy these inequalities. Thus, a calculated relevancy rank for a Pattern search according to at least one exemplary embodiment of the present invention may be defined as:

$$R_{pat} = \sum_{m=1}^{M} \left(\frac{Q_m}{Q}\right)^{\left(2-\frac{Q_M}{|L_m|}\right)} * B_m * P_m \qquad \text{(Eq. 2)}$$

Score Adjustment Factors. The relevancy score of a search result may be adjusted for various reasons including the relative importance of the particular fields that matched, whether the terms matched in one field or matched in several fields, etc. The field boost factor, $B_m$, and linguistic penalty factor, $P_m$, are common field level adjustment factors in information retrieval applications. The field boost factor, $B_m$, is a numeric value which determines the relative importance of a match in a given field in the overall score of the matched document. The linguistic penalty factor, $P_m$, is a numeric value which determines the relative penalty a matched document incurs if it is matched using a linguistic relationship, such as a synonym, rather than directly by matching query text against document contents.

Further, in some cases, the linguistic penalty $P_m$ may be considered within the function $\Phi()$. Thus, according to at least another embodiment of the present invention, the linguistic penalty is moved inside the function $\Phi()$ and a calculated relevancy rank for a Pattern search may be defined as:

$$R_{pat} = \sum_{m=1}^{M} \left(\frac{Q_m * P_m}{Q}\right)^{\left(2-\frac{Q_m}{|L_m|}\right)} * B_m \qquad \text{(Eq. 3)}$$

In order to illustrate the present method of relevancy calculation, consider search against the fields BRAND and PRODUCT_TYPE where the field BRAND has a boost $B_{BRAND}=5$, and the field PRODUCT_TYPE has a boost $B_{PRODUCT\_TYPE}=10$. Consider scores for the following "documents" or products when matched by the query "Calvin Klein Jeans":

Document/Product A (exact match on important fields): BRAND="Calvin Klein", PRODUCT_TYPE="Jeans"

$$R_{pat} = \left(\frac{2*1.0}{3}\right)^{\left(2-\frac{2}{2}\right)} * 5 + \left(\frac{1*1.0}{3}\right)^{\left(2-\frac{1}{1}\right)} * 10 = 6.67$$

Document/Product B (exact match on less important fields): BRAND="Calvin Klein Jeans"

$$R_{pat} = \left(\frac{3*1.0}{3}\right)^{\left(2-\frac{3}{3}\right)} *5 = 5.00$$

Document/Product C (partial match): BRAND="Calvin Klein", assume that partial match is allowed ("Jeans" is left unmatched)

$$R_{pat} = \left(\frac{2*1.0}{3}\right)^{\left(2-\frac{2}{2}\right)} *5 = 3.33$$

Now let's consider incomplete matches for query "Calvin Klein Jeans":
Document/Product D (incomplete partial match on important fields): BRAND="Anne Klein", PRODUCT_TYPE="Jeans"

$$R_{pat} = \left(\frac{1*1.0}{3}\right)^{\left(2-\frac{1}{2}\right)} *5 + \left(\frac{1*1.0}{3}\right)^{\left(2-\frac{1}{1}\right)} *10 = 4.30$$

Document/Product E (incomplete partial match on less important fields, assume maximum shingle length is 2): BRAND="Anne Klein"

$$R_{pat} = \left(\frac{2*1.0}{3}\right)^{\left(2-\frac{2}{2}\right)} *5 = 3.33$$

Document/Product F (partial match): BRAND="Anne Klein", assume that partial match is allowed ("Jeans" is left unmatched)

$$R_{pat} = \left(\frac{1*1.0}{3}\right)^{\left(2-\frac{1}{2}\right)} *5 = 0.96$$

Contrast the incomplete match scores with complete match scores, i.e., 6.67>4.30, 5.00>3.33, and 3.33>0.96, which show that products that are completely matched are ranked higher than products that are incompletely matched to the search query.

In other exemplary embodiments, the relevancy calculation formula for matches in a Pattern search may also be adapted for a product search that use a conventional keyword based search. Unlike a Pattern search, which involves matching on a phrasal basis, where the search query is partitioned into phrases and each phrase in a query partition may only be matched to terms in a single field, a conventional keyword search involves matching on a token-by-token basis, where the search query is tokenized and each token may be matched to terms in multiple fields. Thus, to adapt the relevancy calculation formula for matches in a Pattern search to one for a conventional keyword search, the relevancy scoring calculation must be adapted to be summed across all matched fields {f: 1 ... F} and across all matches in a matched field {n: 1 ... $N_f$}, rather than across phrasal matches {m: 1 ... M}. The following equations show the equivalency between $Q_m$ and $N_f$, where $Q_m$ is the number of query words matched in field m in a Pattern search and $N_f$ is the total number of matches in a field f and $Q_{f,n}$ is the number of terms of the n-th match in field f in a conventional keyword search:

$$Q_m = \sum_{n=1}^{N_f} Q_{f,n} \quad \text{(Eq. 4)}$$

$$\forall f,n: Q_{f,n} = 1 \quad \text{(Eq. 5)}$$

$$Q_m = \sum_{n=1}^{N_f} Q_{f,n} = N_f \quad \text{(Eq. 6)}$$

Eqs. 4-6 show that the number of query terms that matched in a field in a Pattern search is the equivalent to the number of tokens matched in a field in a conventional keyword search because the matches in a conventional keyword search are made on a token-by-token basis, which means each match is for a single token. Therefore, the number of terms matched equals the number of tokens for each field.

A linguistic penalty factor for each matched token may also be considered when calculating a relevancy score or rank for a conventional keyword search. The linguistic penalty factor may vary for each token matched. The following equation shows how the linguistic penalty factor may be adapted for a conventional keyword search:

$$Q_m * P_m = \sum_{n=1}^{N_f} Q_{f,n} * P_{f,n} = \sum_{n=1}^{N_f} P_{f,n} \quad \text{(Eq. 7)}$$

As shown in Eq. 7, the expression $Q_m * P_m$ in Eq. 3 may be substituted by $\sum_{n=1}^{N_f} P_{f,n}$ in view of Eq. 5. Therefore, according to another exemplary embodiment of the present method of relevancy calculation, the calculated relevancy rank of a search result of a conventional keyword search may be defined as:

$$R_{txt} = \sum_{f=1}^{F} \Phi\left(\frac{\sum_{n=1}^{N_f} P_{f,n}}{Q}\right) * B_f \quad \text{(Eq. 8)}$$

where $R_{txt}$ is the document rank, F is the total number of matched fields, $N_f$ is the total number of matches in a field f, $P_{f,n}$ is a linguistic penalty of a the n-th match in field f, $B_f$ is the boost factor for a match in field f, Q is the total query length, and $\Phi()$ is a function of match length that represents a desired relevancy calculation model. For example, $\Phi()$ may be $\Phi(x,a) = x^{2-a}$ the same function used in the relevancy calculation of a Pattern search, where $L_f$ is the total number of field terms in field f.

$$R_{txt} = \sum_{f=1}^{F} \left(\frac{\sum_{n=1}^{N_f} P_{f,n}}{Q}\right)^{\left(2-\frac{N_f}{L_f}\right)} * B_f \quad \text{(Eq. 9)}$$

Proximity Boost Factor. The proximity boost factor, $\Psi_f$, is a numeric value which determines the relative importance of having proximate matched terms within a field. The proximity boost factor may be calculated solely based on the matched spans and field spans and can range from 0 to 1. Preferably, the proximity scoring function, $\Psi_f()$ would satisfy the following inequality:

1=Ψ("b c d")>Ψ("b c k d")>Ψ("b d c")=Ψ("b c j k d")>Ψ("b d k c")>0

According to one embodiment of the present method of relevancy scoring, the formula for calculating a proximity factor boost is: tokensMatched/(tokensMatched+sumDistance) where tokensMatched is the number of matched query terms in a field and sumDistance is calculated by comparing the positions of matched tokens in the query and in the matched field. The variable sumDistance is incremented by 1 for each unmatched token occurring in the matched field between the matched tokens and is incremented by 2 when the matched tokens are transposed.

For example, if a field contains "a b c d e f" and terms a, d, and e matched, then sumDistance=2. A proximity boost factor equal to one means that all matched tokens follow each other in sequence with zero slop. Slop is the distance (i.e., number of unmatched tokens) between two matched tokens in the matched field. When there is some slop, the proximity boost factor will be less than one. When proximity boost is disabled, the proximity boost factor is set to 1.

For Pattern searches, the proximity boost factor is always set to 1. This is because even if the match occurs on part of a field, each match $Q_m$ is considered a separate phrase match and that all words within the match $Q_m$ will always be matched in sequence without any slop.

For conventional keyword searches, the matches are made against individual tokens. Thus, there is no guarantee that all $N_f$ tokens are matched in sequence with slop=0. For such non-ideal matches, a proximity boost factor must be included to ensure that such matches will have a lower rank than sequential matches with slop=0.

Thus, according to another embodiment of the present method of ranking, a proximity boost factor is introduced, where the proximity scoring function, $\Psi_f()$ is defined so that $0<|\Psi_f|<1$. More precisely, the rank of a search result of a conventional keyword search may be defined as:

$$R_{txt} = \sum_{f=1}^{F} \left( \frac{\sum_{n=1}^{N_f} P_{f,n}}{Q} \right)^{\left(2 - \frac{N_f}{L_f}\right)} * |\Psi_f| * B_f \quad (Eq.\ 10)$$

Figure 4:
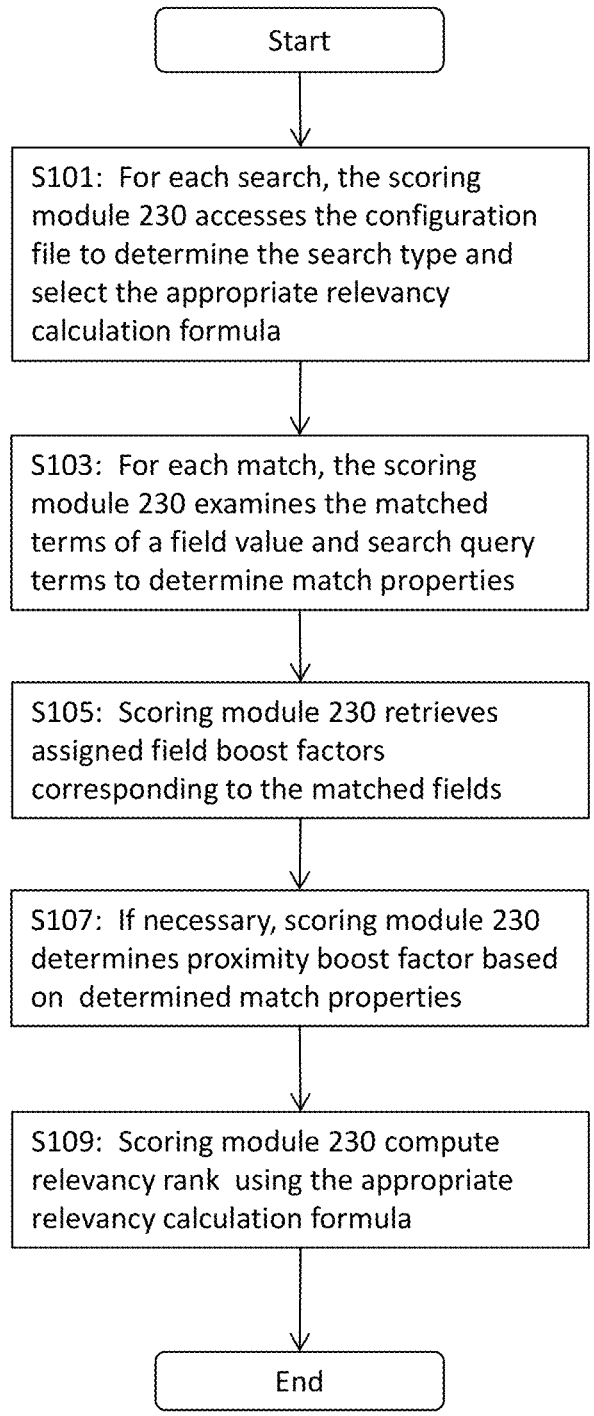
FIG. 4 is a flow chart of a process for calculating relevance of a match in accordance with exemplary embodiments of the present invention.

FIG. 4 shows an embodiment of a computer implemented method of calculating relevancy scores or ranks for search results returned from a keyword based search. In step S101, the search engine server 20 accesses the configuration file and determines the search type and selects a relevancy calculation formula corresponding to the search type detected. In step S103, the search engine server 20 compares the search query and matched fields of each search result to determine particular match properties in accordance with the selected relevancy calculation formula. The match properties are derived from the query terms and field terms and how the terms are matched. For a relevancy calculation formula associated with a Pattern search, the match properties may include, for example, the number of query terms, the number of matched shingles in a query partition, the number of query terms matched in a field value, the number of terms in a matched field, and which field attributes matched. For a relevancy calculation formula associated with a conventional text search, the match properties may include, for example, the number of fields that matched, the number of query terms, the number of field terms, the length of a match, the slop of a match, and which field attributes matched. In step S105, the search engine server 20 determines and retrieves the corresponding field boost factors and linguistic penalty factors associated with the matched field attributes from a database. Each field attribute may be assigned a different boost factor weight based on the importance of the field attribute or linguistic properties of the matched term. These boost factors may, for example, be determined by business and/or semantic rules associated with the electronic commerce application and stored in a configuration file. In step S107, if the search type is determined to be a conventional keyword search a proximity boost factor favoring consecutively matched tokens is determined from the match properties determined in step S101. In step S109, the search engine server 20 computes a relevancy score or rank for each search result based on the selected formula and assigns the relevancy score or rank to the search result. The relevancy score or rank may be computed all at once when the search engine returns all the search results or it may be computed as the search engine finds each match.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A method comprising the steps of:
receiving, using one or more processors, a search query containing search terms from a user device;
executing, using one or more processors, a query on a database based in response to the received search query to generate a search result;
calculating, using one or more processors, a relevancy score for the search result, wherein the relevancy score is determined based on match properties of the search terms and field terms of a matching field of the search result, wherein the matching field comprises at least one of the field terms corresponding to at least one of the search terms on a one-to-one basis, wherein the match properties comprise the number of the search terms, the number of the search terms that correspond to the field terms of the matching field, the number of the field terms of the matching field, and the number of the field terms of the matching field that correspond to the search terms;
determining, using one or more processors, an order of the search result based at least in part on the relevancy score; and
providing, using one or more processors, the search result to the user device based on the order.

2. The method of claim 1, wherein the match properties further comprise a proximity boost factor that is determined based on the number of noncorresponding field terms between two corresponding field terms of the matching field and the number of corresponding field terms that are transposed.

3. The method of claim 1, wherein the match properties further comprise the number of search terms that do not correspond to any of the field terms of the search result.

4. The method of claim 1, wherein the match properties further comprise a ratio of the number of the search terms that correspond to the field terms of the matching field to the number of the search terms.

5. The method of claim 1, wherein the match properties further comprise the number of the search terms that correspond consecutively to the field terms of the matching field.

6. The method of claim 5, wherein the relevancy score is determined so that a search result having a longer match in the matching field has a higher relevancy score than a search result having multiple shorter matches in the same matching field, where the number of the search terms of the longer match is the same as the total number of the search terms in the shorter matches.

7. The method of claim 1, wherein the relevancy score is determined so that the relevancy score for a complete field match and the relevancy score for an incomplete field match are different, where a complete field match occurs when all field terms of a field value of the matching field corresponds sequentially to the search terms.

8. The method of claim 1, wherein the match properties further comprise a ratio of the number of the field terms of the matching field that correspond to the search terms to the number of the field terms of the matching field.

9. The method of claim 1, wherein the match properties comprise a normalized percentage of the search terms that correspond to the field terms of the matching field and a normalized percentage of the field terms of the matching field that correspond to the search terms.

10. The method of claim 9, wherein the match properties further comprise a field boost factor.

11. The method of claim 9, wherein the match properties further comprise a linguistic penalty factor.

12. A method comprising the steps of:
receiving, using one or more processors, a search query comprising one or more search terms from a user device;
executing, using one or more processors, a query on a database in response to the search query to generate a search result,
wherein the database contains a document associated with an item available for purchase, the document is indexed into a search index file, wherein the document includes a field having a field value comprising one or more field terms,
wherein the search result contains a phrase match comprising the one or more search terms corresponding to the one or more field terms of the field;
determining, using one or more processors, a score for the search result by:
determining a first normalized value for the phrase match, wherein the first normalized value quantifies a percentage of the one or more search terms that corresponded in the phrase match;
determining a second normalized value for the phrase match, wherein the second normalized value quantifies a percentage of the one or more field terms that corresponded in the phrase match;
determining a phrase length weight for the phrase match based at least in part on the first normalized value and the second normalized value; and
calculating the score based at least in part on the phrase length weight; and
providing, using one or more processors, the search result to the user device based at least in part on the score.

13. The method of claim 12, wherein the phrase length weight quantifies a preference that a single phrase match in the field is ranked higher than multiple phrase matches in the field when a combined length of the multiple phrase matches is the same as a length of the single phrase match.

14. The method of claim 12, wherein the field value is indexed as a plurality of shingled field values, the step of calculating the score further comprises calculating the score in accordance with the following formula:

$$R_{pat} = \sum_{m=1}^{M} \Phi(x_m, a_m) * B_m * P_m$$

where $R_{pat}$ is the score, M is the number of phrase matches in the search result, m is the $m^{th}$ phrase match, $x_m$ is a first normalized value for the $m^{th}$ phrase match, $a_m$ is a second normalized value for the $m^{th}$ phrase match, $\Phi()$ is a function that provides a matched phrase contribution, $B_m$ is a field boost factor for the $m^{th}$ phrase match, and $P_m$ is a linguistic penalty for the $m^{th}$ phrase match.

15. The method of claim 14, wherein $\Phi(x_m, a_m)$ is a superlinear function.

16. The method of claim 14, wherein the function $\Phi(x_m, a_m)$ satisfies the following condition $0<\Phi(x, a)<\Phi(y, b)$, for any numbers x, y, a, and b, where $0<x<1$, $0<y<1$, $0<a\leq1$, $0<b\leq1$, x=y, and a<b.

17. The method of claim 14, wherein the function $\Phi(x_m, a_m)$ satisfies the following condition $0<\Phi(x, a)<\Phi(y, b)$, for any numbers x, y, a, and b, where $0<x<1$, $0<y<1$, $0<a=b\leq1$, and x<y.

18. The method of claim 14, wherein the function $\Phi(x_m, a_m)$ satisfies the following condition $\Phi(x, a)+\Phi(y, a)<\Phi(x+y, a)$, for any numbers x, y, and a, where $0<a<1$, $0<x<1$ and $0<y<1$.

19. The method of claim 14, wherein the function $\Phi(x_m, a_m)$ satisfies the following condition $\Phi(x, 1)+\Phi(y, 1)=\Phi(x+y, 1)$, for any numbers x, and y, where $0<x<1$ and $0<y<1$.

20. The method of claim 14, wherein the function $\Phi(x_m, a_m)$ is $x_m^{2-a_m}$ where $0<x_m<1$ and $0<a_m<1$.

21. The method of claim 14, wherein the plurality of shingled field values comprise shingled field values of varying lengths.

22. The method of claim 21, where $$a_m = \frac{Q_m}{L_m},$$

where $Q_m$ is the number of the one or more search terms that corresponded in the $m^{th}$ phrase match and $L_m$ is the length of the longest one of the plurality of shingled field values.

23. The method of claim 14, where $$x_m = \frac{Q_m}{Q},$$

where $Q_m$ is the number of the one or more search terms that corresponded in the $m^{th}$ phrase match and Q is the total number of the one or more search terms.

24. The method of claim 12, wherein the one or more field terms are indexed as individual tokens, the step of calculating the score further comprises calculating the score in accordance with the following formula:

$$R_{txt} = \sum_{f=1}^{F} \Phi\left(\frac{\sum_{n=1}^{N_f} P_{f,n}}{Q}\right) * B_f$$

where $R_{txt}$ is the score, F is the number of fields in the search result in which a phrase match occurs, f is the $f^{th}$ field, $$\frac{\sum_{n=1}^{N_f} P_{f,n}}{Q}$$

is the first normalized value in the $f^{th}$ field, Q is the total number of the one or more search terms, $N_f$ is the number of the one or more search terms that corresponded in the phrase match in the $f^{th}$ field, n is the $n^{th}$ corresponding search term, $P_{f,n}$ is a linguistic penalty for the $n^{th}$ corresponding search term in $f^{th}$ field, $a_f$ is the second normalized value in the $f^{th}$ field, $B_f$ is the boost factor for the phrase match in the $f^{th}$ field, and $\Phi(\ )$ is a function that provides a matched phrase contribution.

25. The method of claim 24, where $$a_f = \frac{N_f}{L_f},$$

where $L_f$ is the total number of the one or more field terms in the $f^{th}$ field.

26. The method of claim 24, wherein the one or more field terms in the $f^{th}$ field do not sequentially correspond to the one or more search terms, further comprising the step of determining a proximity factor for the phrase match in the $f^{th}$ field based at least in part on a distance between corresponding field terms in the $f^{th}$ field.

27. The method of claim 24, wherein the one or more field terms in the $f^{th}$ field are ordered, further comprising the steps of:

determining a proximity boost factor based in part on the number and position of the one or more field terms that do not correspond sequentially to the one or more search terms; and calculating the score based at least in part on the proximity boost factor.

* * * * *

UNITED STATES PATENT AND TRADEMARK OFFICE
CERTIFICATE OF CORRECTION

PATENT NO. : 9,633,085 B2
APPLICATION NO. : 14/298043
DATED : April 25, 2017
INVENTOR(S) : Denis Kamotsky It is certified that error appears in the above-identified patent and that said Letters Patent is hereby corrected as shown below:

In the Claims

In Claim 20, Line 28, delete "$0 < a_m < 1$" and insert --$0 < a_m \leq 1$--

In Claim 24, Line 60, delete " $R_{txt} = \sum_{f=1}^{F} \Phi \left( \frac{\sum_{n=1}^{N_f} P_{f,n}}{Q} \right) * B_f$ " and insert -- $R_{txt} = \sum_{f=1}^{F} \Phi \left( \frac{\sum_{n=1}^{N_f} P_{f,n}}{Q}, a_f \right) * B_f$ --

Signed and Sealed this
Twentieth Day of June, 2017

Joseph Matal
*Performing the Functions and Duties of the
Under Secretary of Commerce for Intellectual Property and
Director of the United States Patent and Trademark Office*